United States Patent [19]
Tomisawa et al.

[11] Patent Number: 5,445,124
[45] Date of Patent: Aug. 29, 1995

[54] METHOD AND APPARATUS FOR CONTROLLING THE IDLE SPEED OF AN INTERNAL COMBUSTION ENGINE

[75] Inventors: Naoki Tomisawa; Satoru Watanabe, both of Atsugi, Japan

[73] Assignee: Unisia Jecs Corporation, Atsugi, Japan

[21] Appl. No.: 210,390

[22] Filed: Mar. 18, 1994

[30] Foreign Application Priority Data

Mar. 18, 1993 [JP] Japan .................................. 5-058878

[51] Int. Cl.⁶ .............................................. F02D 41/16
[52] U.S. Cl. ................................................ 123/339.11
[58] Field of Search ........................................... 123/339

[56] References Cited

U.S. PATENT DOCUMENTS

| | | | |
|---|---|---|---|
| 4,572,127 | 2/1986 | Morris | 123/339 |
| 4,658,787 | 4/1987 | Takizawa | 123/339 |
| 4,732,125 | 3/1988 | Takizawa | 123/339 |

FOREIGN PATENT DOCUMENTS

63-75334  4/1988  Japan .
1-179148 U 12/1989  Japan .
5-240090  9/1993  Japan .

*Primary Examiner*—Andrew M. Dolinar
*Attorney, Agent, or Firm*—Foley & Lardner

[57] ABSTRACT

The present invention relates to the idle speed control of an internal combustion engine. The output torque required for obtaining the target idle speed is computed, the ignition timing correction amount required for obtaining said required output torque and similarly, the auxiliary air flow rate through the auxiliary air control valve bypassing the throttle valve required for obtaining said required output torque are computed. By carrying out these computations simultaneously, the torque correction is carried out in the best possible response speed by the ignition timing control and subsequently, the torque correction by the auxiliary air flow rate control is carried out. Thereby, the response characteristic of idle speed control can be significantly improved.

14 Claims, 6 Drawing Sheets

Fig. 8

FOR EACH PREDETERMINED PERIOD ( IDLE SPEED CONTROL )

S31: [Graph: $N_{SET}$ vs WATER TEMPERATURE]

S32: DETECTION OF ACTUAL ROTATION SPEED Ne

S33: $\Delta T \leftarrow GAIN \left( \dfrac{N_{SET}}{Ne} - 1 \right)$

S34: DADV RETRIEVAL [Graph: DADV vs $\Delta T$]

S35: $ADV \leftarrow ADV + DADV$

S36: $\Delta Q = GAIN \cdot N_{SET} \cdot \Delta T$

S37: [Graph: $\Delta DUTY$ (%) vs $\Delta Q$ (l/min)]

S38: $ISC_{ON}$ OUTPUT ( END )

METHOD AND APPARATUS FOR CONTROLLING THE IDLE SPEED OF AN INTERNAL COMBUSTION ENGINE

TECHNICAL FIELD

The present invention relates to a method and an apparatus for controlling the idle speed of an internal combustion engine, more particularly, to technology for improving the response characteristic of an apparatus for controlling the idle speed to the target speed by adjusting the intake air flow rate during idle operation.

BACKGROUND ART

Conventionally, an apparatus for controlling the idle speed of an internal combustion engine has been proposed in which an auxiliary air control valve is provided in an auxiliary air path bypassing a throttle valve and the opening degree of said auxiliary air control valve during idle operations is controlled, thereby, the idle speed is controlled by controlling the amount of auxiliary air supplied to the engine via said auxiliary air path (Japanese Unexamined Utility Model Publication No. 1-179148).

Said auxiliary air control valve is of the solenoid type and the valve opening degree thereof is controlled according to the duty ratio (the time ratio expressed as a percentage, of the pulse width to the period, when the opening degree is controlled by controlling the pulse width of the drive pulse signal for valve opening fed at a constant period of time).

Further, the duty ratio $ISC_{ON}$ (%) fed to said auxiliary air control valve is calculated for example according to the following equation:

$$ISC_{ON} = ISC_{TW} + ISC_{CL}$$

Here, $ISC_{TW}$ is the basic control value which is set referring to a map in the ROM based on the engine cooling water temperature Tw. $ISC_{CL}$ is the feedback correction value which is set, based on the result of comparison of the engine rotational speed with the target idle speed under the idle speed feedback control conditions so that the actual engine rotational speed approaches the target idle speed, for example, with the proportional integral control.

Specifically, the target idle speed $N_{SET}$ is compared with the actual engine rotational speed Ne, and, if for example the engine rotational speed is lower than the target idle speed, said duty ratio $ISC_{CL}$ is gradually increased by the integration operation amount, and also, said duty ratio $ISC_{CL}$ is corrected to be increased according to the proportional operation amount depending on the deviation of the actual engine rotational speed from the target idle value.

Thus, in the conventional idle speed control, the response characteristic of control and the suppression of overshoot generation were balanced by gradually varying the auxiliary air flow rate over a long time duration with the proportional and integral control while monitoring the change in the engine rotational speed. This is because, when the engine rotational speed was decreased, for example, due to the application of load, the amount of increase of the auxiliary air flow rate finally required was not known at the time of increasing the auxiliary air flow rate matching with the applied load.

That is, during the period between the application of the control signal to the auxiliary air control valve and the result of actual control affecting the engine rotational speed, there are the processes of the auxiliary air being sucked into the cylinder via the manifold, the air-fuel mixture sucked into the cylinder undergoing explosion, the angular velocity changing due to the pressure of this explosion, the period of rotation signal generation changing thereby, and this change being detected as a change in the rotational speed. Therefore, even when the auxiliary air control valve is controlled, there is a response delay time until such a control is detected as an actual change in the engine rotational speed.

As a result, in the condition that the finally required auxiliary air flow rate is not known since it is necessary to repeat the steps of gradually varying the auxiliary air flow rate over a considerably long time duration with the proportional and integral control, confirming a result of this control as the change in the actual rotational speed, and then adjusting the auxiliary air flow rate after determining the next control direction, it is not possible to set the feedback response time faster than said response delay time and also the overshoot will become large if the rate of change of the auxiliary air flow rate is made large.

Thus, according to the conventional idle speed control, it was difficult to improve the response characteristic of the control and to sufficiently suppress the generation of undershoot, for example, at the time a load is applied, it was necessary to set a relatively high target idle speed so that the target idle speed did not become lower than the rotational speed at the engine stalling limit even when said undershoot occurred, and it was difficult to realize the reduction of target idle speed for improving the fuel consumption because such reduction was restricted by the magnitude of said undershoot.

Japanese Unexamined Patent Publication No. 63-75334, etc. propose technology to carry out the control of engine rotational speed by the linear modeling of the dynamic behavior of an internal combustion engine as technique for improving the response characteristic of the feedback control.

Specifically, the feedback control amount is determined based on the numeric model obtained by digitizing, by sampling at each constant crank angle the dynamic physical model of the engine made by using the intake pressure and the rotational speed.

However, since the model obtained by digitizing by sampling at each constant crank angle was used in said technique, there was the problem that a processor capable of high speed computations for carrying out complex calculations is required in an actual control.

In view of the above, the inventors have previously proposed an apparatus where the response characteristic can be improved without complex calculations by setting the output torque required from the engine so as to obtain the target idle speed and controlling the opening degree of the auxiliary air control valve so as to obtain the required auxiliary air flow rate corresponding to the required output torque (Japanese Unexamined Patent Publication No. 5-240090).

However, there are limitations to obtain a higher response characteristic of idle speed control by only improving the response characteristic of the auxiliary air control valve, therefore a further improvement is needed.

That is, there are the problems that even if the auxiliary air control valve is controlled with a fast response speed so that the required auxiliary air flow rate corresponding to the required output torque is achieved, there is a response delay from the time when the auxiliary air control valve is controlled until the required auxiliary air flow rate is obtained, and response speed is particularly slow in the case of stepping motors generally used for driving an auxiliary air control valve (the time delay from the application of the drive signal until the auxiliary air control valve is set to the desired opening degree is too large). In addition, in the case of an electronically controlled fuel injection type internal combustion engine, even if the auxiliary air control valve is controlled so that the required auxiliary air flow rate is achieved, there is a response delay from the detection of said required auxiliary air flow rate until the correction control of the fuel injection amount is carried out. Therefore, the initial engine rotational speed variations at the time of Icad change caused by said response delay can not be avoided by merely improving the response characteristic of the auxiliary air control valve.

SUMMARY OF THE INVENTION

In view of the problems described above, an object of the present invention is to provide a method and an apparatus for controlling the idle speed of an internal combustion engine in which the response characteristic of idle speed control at the time of Icad variations is improved as much as possible by using the ignition time control having a high response characteristic in addition to the idle speed control by an auxiliary air control valve of which response characteristic is improved.

Another object of the present invention is to suppress deteriorations in the exhaust gas composition and in fuel consumption due to the idle speed control to the extent that such deteriorations can be negligible.

Still another object of the present invention is to obtain the target idle speed in a stable manner while carrying out the idle speed control.

A further object of the present invention is to obtain the target idle speed with a high accuracy while carrying out the idle speed control.

To achieve the objects, the method and apparatus for controlling the idle speed of an internal combustion engine according to the present invention is constructed as shown in FIG. 1 that the opening degree of an auxiliary air control valve provided in an auxiliary air path bypassing a throttle valve is controlled during idle operation so as to control an auxiliary air flow rate, thereby controlling the idle speed.

In FIG. 1, a target idle speed setting step or means sets a target idle speed during the idle operation of the engine, a required output torque setting step or means sets a required output torque necessary for the engine in order to obtain the target idle speed, a required ignition timing correction amount conversion step or means converts said set required output torque into a value corresponding to a required ignition timing correction amount, and a required auxiliary air flow rate computation step or means computes a required auxiliary air flow rate based on the required output torque and said target idle speed.

In addition, an ignition timing correction control step or means controls the ignition timing correction based on the value corresponding to the required ignition timing correction amount converted in the required ignition timing correction amount conversion step or means, and a valve opening control step or means controls the opening degree of said auxiliary air control valve based on the value corresponding to the required auxiliary air flow rate computed in the required auxiliary air flow rate computation step or means.

According to the construction mentioned above, the required output torque necessary for the engine in order to obtain the target idle speed is set, the set output torque is converted into the value corresponding to the required ignition timing correction amount thereby controlling the ignition timing correction. At the same time the set output torque is converted into a value corresponding to the auxiliary air flow rate thereby controlling the auxiliary air control valve, however, to begin with, the required output torque necessary for obtaining said target idle speed is obtained by the ignition timing correction control with the smallest possible response delay, and then the auxiliary air flow rate is controlled to a value for obtaining the required output torque.

In addition, said target idle speed setting step or means may comprise a step or means for detecting the cooling water temperature of the engine and a step or means for setting a target idle speed based on the detected cooling water temperature.

With such a construction, it is possible to set the target engine rotational speed to an appropriate value in terms of the promotion of engine warming up and the fuel consumption.

Further, said required torque setting step or means may comprise a step or means for setting a basic output torque based on a target idle speed and the engine cooling water temperature, a step or means for setting an auxiliary equipment load correction component which is set according to a drive load applied to auxiliary equipments, a step or means for setting a corrected basic output torque by adding said auxiliary equipment load correction component to said basic output torque, a step or means for detecting an output torque of the engine, and a step or means for setting a finally required output torque by adding a difference between said corrected basic output torque and said detected output torque of the engine to said corrected basic output torque Here, the basic output torque is the engine output torque required for obtaining the target idle speed including the auxiliary equipment load. Since the required torque corrected according to the actually detected engine output torque is obtained as the actually required torque by adding the torque generated by the engine combustion and the friction (the pumping loss component) and is a value set including the performance variations and the like among individual engines as the products, it is possible to accurately obtain the required torque with compensating for said variations.

Further, said required output torque setting step or means may also comprise a step or means for setting a basic output torque based on the target idle speed, the engine cooling water temperature and the drive load applied to auxiliary equipments, a step or means for computing an excess or insufficient torque amount based on a variation amount in the engine rotational speed, and a step or means for setting the required torque after correcting said basic output torque with said excess or insufficient torque amount.

With such a construction, since the required output torque is obtained as the excess or insufficient torque amount based on variations in the engine rotation, it is possible to control the engine rotational speed in a stable manner to the target idle speed with the elimination of said variations in the engine rotation.

Further, said required output torque setting step or means may also be constructed by a step or means for computing the excess or insufficient torque amount based on a variation amount in the engine rotational speed, and said required auxiliary air flow rate computation step or means by a step or means for computing a required auxiliary air flow rate proportionally to an integrated value of said target idle speed and the excess or insufficient torque amount.

With such a construction, since the excess or insufficient torque amount is set according to the deviation between the actually detected engine rotational speed and the target idle speed, and the required auxiliary air flow rate is computed according to the excess or insufficient torque amount, it is possible to control the engine rotational speed to the target idle speed with a high accuracy.

Further, said required auxiliary air flow rate computation step or means may also comprise a step or means for computing an overall required air flow rate by integrating the required torque and the target idle speed, and a step or means for computing the required auxiliary air flow rate by subtracting an air flow rate leaking from said throttle valve from said overall required air flow rate.

With such a construction, the value obtained by integrating the required output torque and the target idle speed is the required engine output and is a value proportional to the overall required air flow rate if the air-fuel ratio is considered to be approximately constant. Also, since there is the air flow rate leaking from the throttle valve, it is possible to obtain the required auxiliary air flow rate through the auxiliary air control valve by subtracting this leakage air flow rate from said overall required air flow rate.

Further, said ignition timing correction control step or means may also be constructed so as to stop the ignition timing correction after the lapse of response delay time of correction control of said auxiliary air flow rate.

According to said construction, although, if said ignition timing correction is continuously carried out, an inappropriate ignition timing correction is maintained and there are some problems in terms of the exhaust gas composition and fuel consumption, it is possible to ignore these problems because the ignition timing correction is carried out only in the most initial period which cannot be avoided by the auxiliary air control valve.

BRIEF DESCRIPTION OF DRAWINGS

FIG. 8 is a flow chart showing the idle speed control for setting the required output torque based on the ratio of the target idle speed to the actual engine rotational speed.

DETAILED DESCRIPTION OF THE PREFERRED EMBODIMENT

A preferred embodiment of the present invention is described below.

Figure 1:
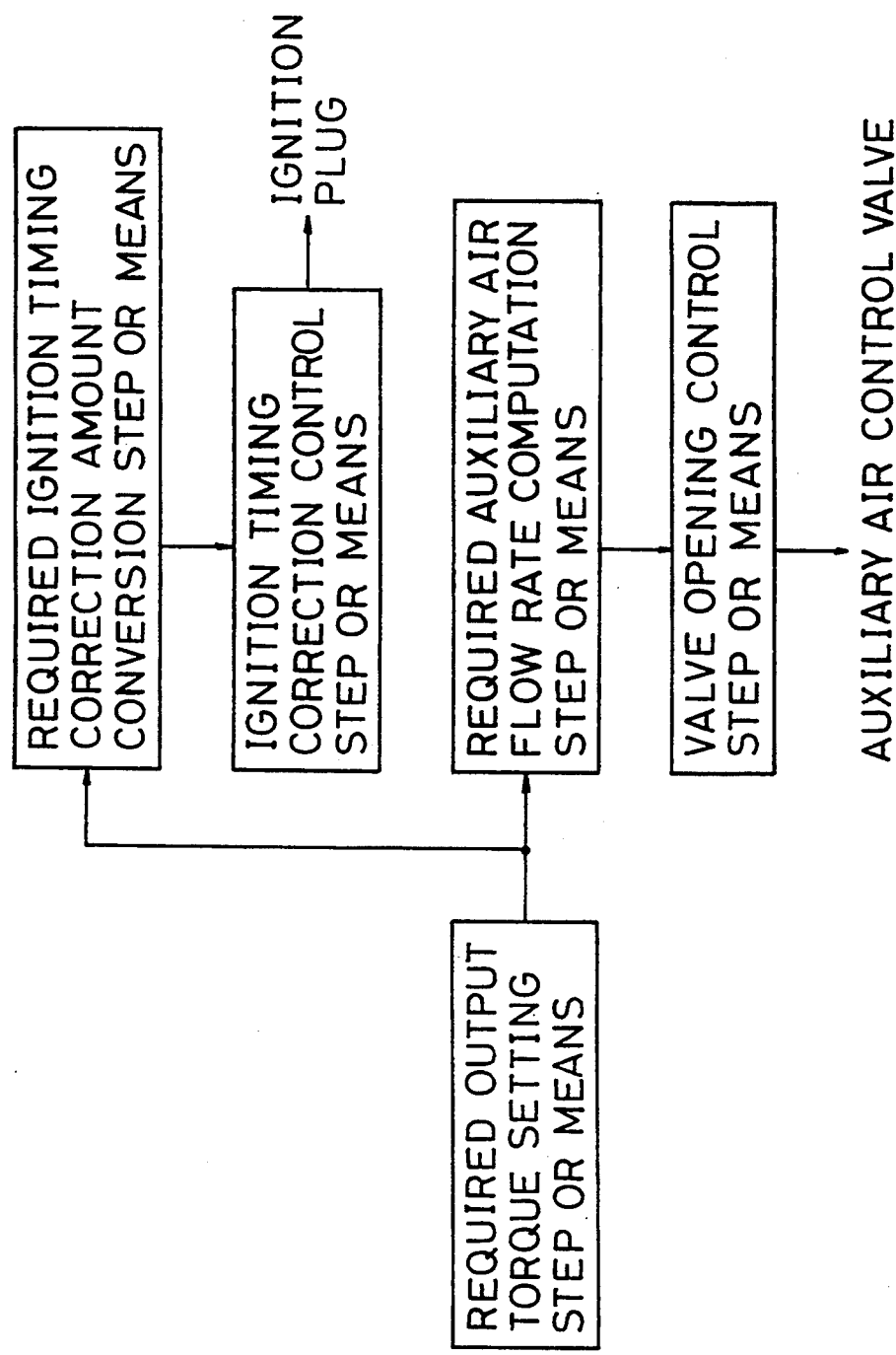
FIG. 1 is a block diagram showing the basic construction of the present invention.
Figure 2:
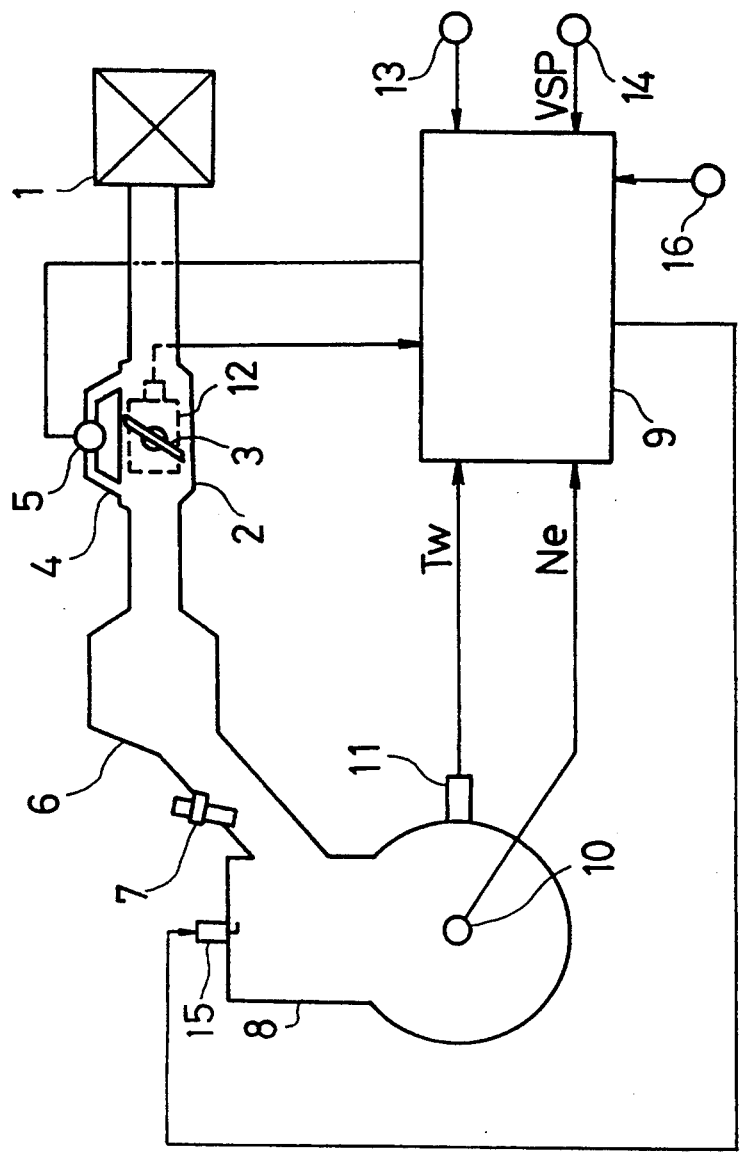
FIG. 2 is a schematic system diagram showing an embodiment according to the present invention.

In FIG. 2 showing a system structure of the present embodiment, air is introduced from an air cleaner 1 and a flow rate thereof is controlled, in a throttle chamber 2, by a throttle valve 3 which is linked to an accelerator pedal not shown in the figure, and also by a solenoid type auxiliary air control valve 5 installed in an auxiliary air path 4 bypassing said throttle valve 3. Then, the air is mixed with fuel which is injected from a fuel injection valve 7 in the branch section of an air intake manifold 6 and is then sucked into cylinders of an engine 8.

The opening degree of the auxiliary air control valve 5 is controlled by a control signal (opening drive signal duty ratio $ISC_{ON}$) from a control unit 9, and signals from various types of sensors are input to the control unit 9 for controlling the opening degree.

As such various types of sensors are provided a crank angle sensor 10 capable of computing the engine rotational speed Ne from the period $T_{REF}$ of a reference signal REF which is output for each predetermined crank angle and also a water temperature sensor 11 for detecting the engine cooling water temperature $T_W$. Apart from these are provided an idle switch 12 which is turned ON at the fully closed position of the throttle valve 3, a neutral switch 13 which is turned ON in the neutral position of a transmission, and a vehicle speed sensor 14 for detecting the vehicle speed VSP.

Further, ignition plugs 15 are provided for each cylinder of the engine 8 and the control of ignition timing (ignition timing advance) ADVT by the ignition plugs 15 is carried out by an ignition timing signal from the control unit 9.

In addition, a torque sensor 16 is provided as an output torque detecting means for detecting an output torque Torque of the engine 8. It is also possible to compute said output torque Torque from other engine parameters as will be described later.

Figure 3:
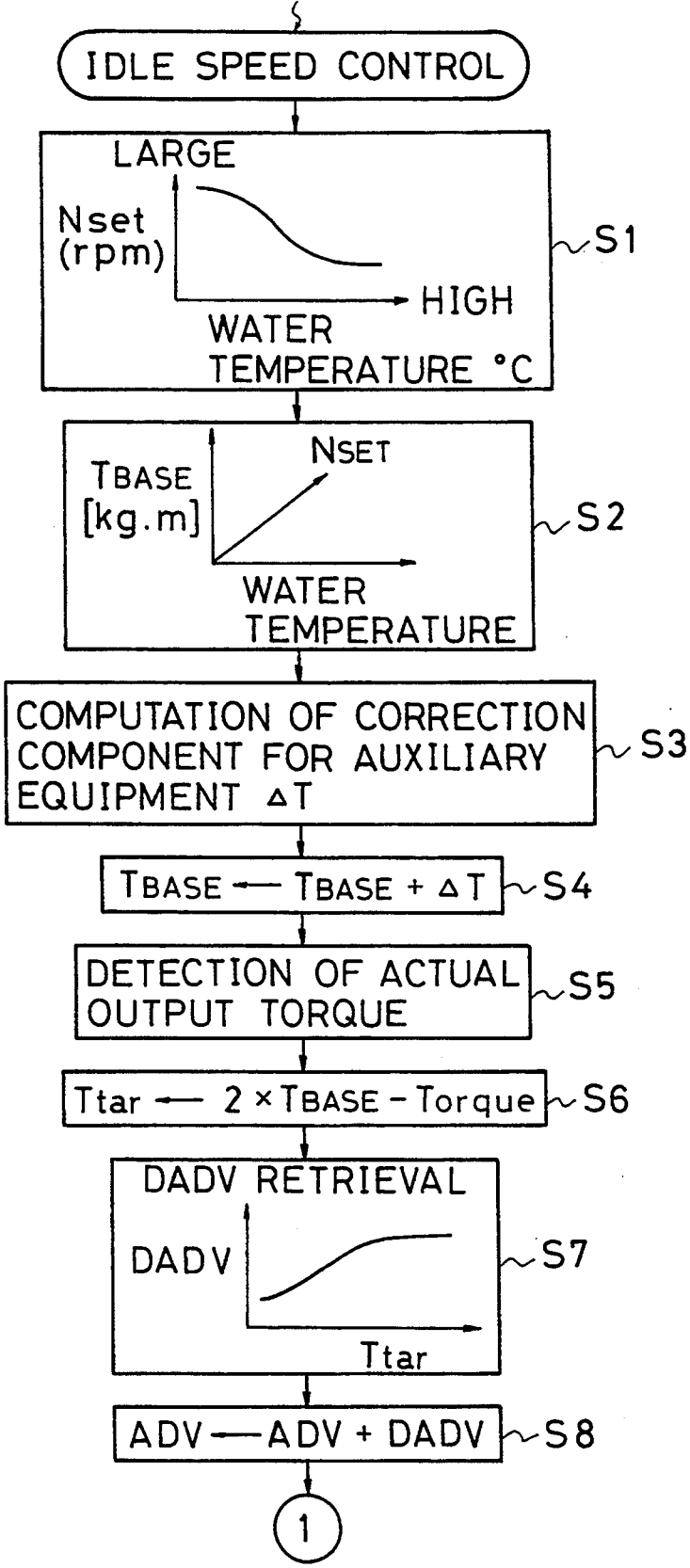
FIG. 3 is the first half of a flow chart showing an embodiment of idle speed control.
Figure 4:
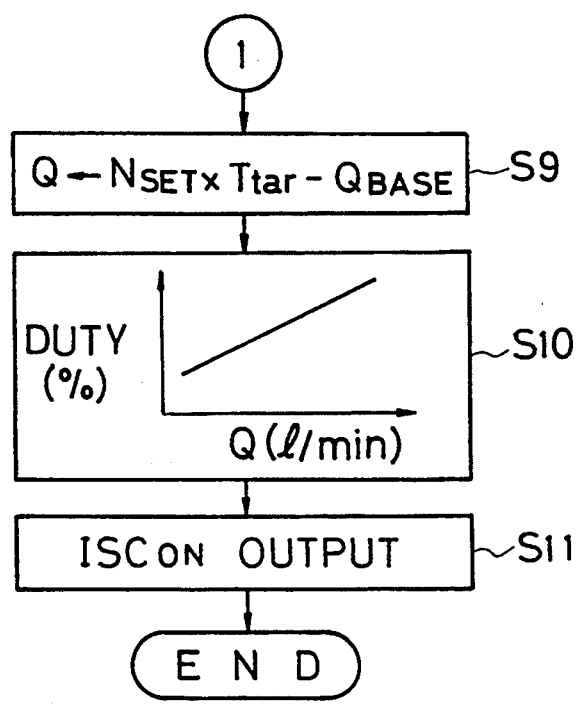
FIG. 4 is the second half of the flow chart showing the embodiment of idle speed control.

Here, a microcomputer within the control unit 9 carries out the computation operations according to the flow chart given in FIGS. 3 and 4 when the feedback control condition of idle speed is being satisfied and thereby controls the ignition timing of the ignition plugs 15 and the opening degree of the auxiliary air control valve 5.

Further, the feedback control condition is that the idle switch 12 which is turned ON at the fully closed position of the throttle valve 3 is ON and at the same time the neutral switch 13 which is turned ON in the neutral position of the transmission is ON, or that the idle switch 12 is ON and at the same time the vehicle speed VSP detected by the vehicle speed sensor 14 is equal to or less than a predetermined value (for example, 8 km/h). Further, the functions as the required output torque setting means, the required ignition timing correction amount conversion means, the ignition timing control correction means, the required auxiliary air flow rate computation means, and the valve opening control means according to the present invention are all incorporated in the control unit 9 in the form of a software as shown in the flowchart of FIGS. 3 and 4.

In the flowchart of FIGS. 3 and 4, firstly, in step 1 (with "step" denoted by S in the figure), a map pre-storing a target idle speed $N_{SET}$ according to the cooling water temperature $T_W$ is referenced based on a value detected by the water temperature sensor 11 and a target idle speed $N_{SET}$ corresponding to the current cooling water temperature $T_W$ is obtained.

Next, in step 2, a basic output torque $T_{BASE}$ corresponding to the target idle speed $N_{SET}$ set in step 1 and the value detected by the water temperature sensor 11 is retrieved and obtained from a map pre-storing the basic output torque $T_{BASE}$ corresponding to the target idle speed $N_{SET}$ and the cooling water temperature $T_W$.

Said basic output torque $T_{BASE}$ is the ideal engine output torque required for obtaining the target idle speed $N_{SET}$ and is a value that makes the actual idle speed become approximately equal to the target idle speed $N_{SET}$ if this basic output torque $T_{BASE}$ is generated on the ideal condition.

Next, in step 3, an auxiliary equipment Icad correction component $T_A$ is set for increasingly correcting the basic output torque $T_{BASE}$ according to the drive Icad applied to auxiliary equipments such as a compressor for an air conditioner or an oil pump for a power steering, and also a shift from the neutral to the drive range in a torque converter type automatic transmission, an alternator, etc.

Next, in step 4, said auxiliary equipment Icad correction component $T_A$ is added to the basic output torque $T_{BASE}$ set in step 3, and the result of this addition is set as a corrected basic output torque $T_{BASE}$. Therefore, the corrected basic output torque $T_{BASE}$ set in step 4 is an engine output torque required for obtaining the target idle speed $N_{SET}$ including the auxiliary equipment load.

Next, in step 5, an output torque Torque of the engine 8 is detected by the torque sensor 16.

When the actual engine output torque Torque is detected, control proceeds to step 6 where an engine output torque Ttar required for obtaining the target idle speed $N_{SET}$ by correcting the corrected basic output torque $T_{BASE}$ with the detected actual output torque Torque according to the following equation. This required output torque Ttar is an actual required torque obtained by adding the torque generated by the engine combustion and the friction torque component (pumping loss component) and is a value set including also variations among different engines as the products, etc.

$$\text{Ttar} = T_{BASE} + (T_{BASE} - \text{Torque}) \tag{1}$$

Next, in step 7, an ignition timing correction amount (advance value) DADV required for obtaining the required output torque Ttar computed in the equation (1) is obtained by retrieving a map pre-storing experimentally the required output torque - the ignition timing correction amount.

In step 8, an ignition timing ADV is corrected by the ignition timing correction amount DADV obtained in step 7 and is output.

Next, in step 9, an auxiliary air flow rate Q required for obtaining the target idle speed $N_{SET}$ is computed on the basis of the target idle speed $N_{SET}$ and the required output torque Ttar according to the following equation.

$$Q = N_{SET} \times \text{Ttar} - Q_{BASE} \tag{2}$$

Here, $Q_{BASE}$ is the air leakage sucked into the engine via a path other than the auxiliary air control valve 5, that is, via the throttle valve 3, etc., in idle operation.

In other words, although it is possible to compute an intake air flow rate of the engine on the basis of the engine rotational speed Ne and the engine output torque (Q←Ne×output torque). However, since this intake air flow rate is an overall intake air flow rate of the engine including the air leakage from the throttle valve 3, etc., in addition to the auxiliary air flow rate controlled by the auxiliary air control valve 5, the value obtained by subtracting the air leakage $Q_{BASE}$ from the overall intake air flow rate of the engine corresponds to the auxiliary air flow rate.

Here, the basic output torque $T_{BASE}$ required for maintaining the target idle speed $N_{SET}$ in the ideal condition is computed. Said basic output torque is actually generated so that the engine rotational speed is controlled to the target idle speed $N_{SET}$, by basically setting the auxiliary air flow rate Q so as to obtain this basic output torque $T_{BASE}$.

Next, in step 10, in order to control the opening degree of the auxiliary air control valve 5 to obtain the required auxiliary air flow rate Q computed in step 9, the duty ratio corresponding to the currently required auxiliary air flow rate Q is retrieved and obtained by referring to a map pre-storing the duty ratio (%) corresponding to the required auxiliary air flow rate Q.

Next, in step 11, a drive signal $ISC_{ON}$ of this duty ratio is output to the auxiliary air control valve 5 thereby making it possible to obtain actually the auxiliary air flow rate set in step 9 via the auxiliary air control valve 5.

Figure 5:
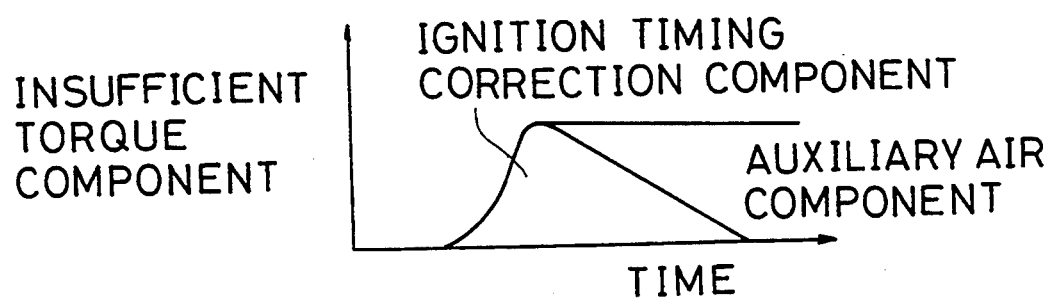
FIG. 5 is a timing chart showing the state of insufficient torque compensation by ignition timing correction amount control and auxiliary air flow rate control in the embodiment of idle speed control.

According to this structure, if the output torque (rotational speed) of the engine decreases due to the application of load, etc., although the required output torque to be able to compensate for the decreased amount is set and the ignition timing correction control and the auxiliary air flow rate control corresponding to the required output torque are carried out simultaneously, there is a time delay as shown in FIG. 5 until a desired auxiliary air flow rate is obtained by the auxiliary air flow rate control, and during this period it is possible to obtain the required output torque with extremely good response with the ignition timing correction control. Subsequently, once the auxiliary air flow rate corresponding to the required output torque is obtained by the auxiliary air control valve 5, the ignition timing is returned to the original value, and thereafter it is possible to obtain the required output torque with only the auxiliary air flow rate control.

Therefore, even if there is the application of load in an ON-OFF manner, the increase or decrease in the auxiliary air flow rate corresponding to this load can be carried out as fast as possible. As a result, it is possible to improve the response characteristic of the feedback control, and consequently, since it is possible to make the undershoot of the idle speed small, it is possible to avoid the occurrence of engine stalling even if the target idle speed is decreased. Further, since this structure does not require complex computations as stated above, a high performance processor is not required and the processing can be done by an ordinary processor.

Further, if the generation of required output torque with ignition timing correction is continued, then inappropriate ignition timing is maintained and there are problems in terms of the exhaust gas composition and fuel consumption, etc.. However, there is absolutely no problem in the present invention because the response characteristic of the auxiliary air control valve is made as high as possible and the required output torque is generated with ignition timing correction only during the unavoidable most initial period.

Further, in the present embodiment, a difference between the basic output torque $T_{BASE}$ and the actual engine output torque Torque is obtained and is added as the feedback correction component to said basic output torque $T_{BASE}$ thereby making it possible to avoid an influence due to variations among individual engines as the products including engine friction. For example, even if the controls of ignition timing correction and auxiliary air flow rate are carried out based on the basic output torque $T_{BASE}$, when the basic output torque $T_{BASE}$ required for maintaining the target idle speed $N_{SET}$ is not actually obtained, the basic output torque $T_{BASE}$ is corrected to be increased and the ignition timing correction amount or the auxiliary air flow rate are increased so as to correspond to the corrected amount of the basic output torque $T_{BASE}$, thereby making it possible to obtain the target idle speed $N_{SET}$.

Figure 6:
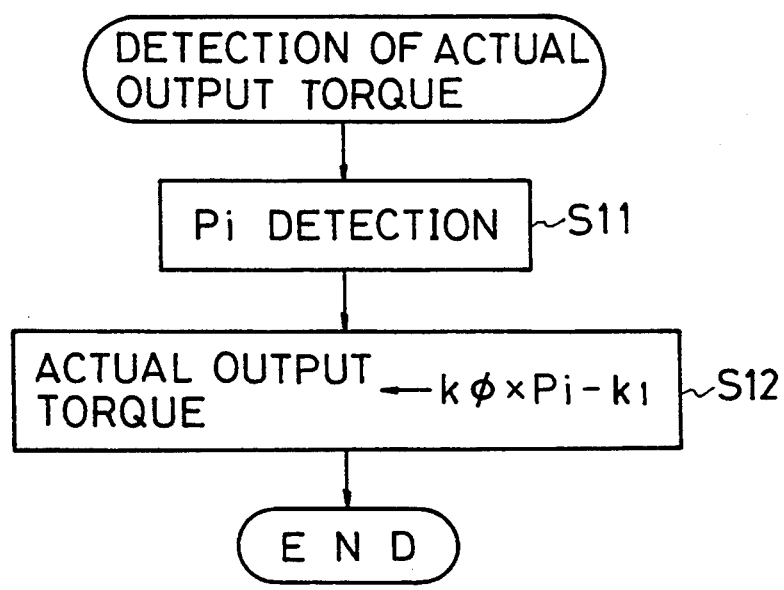
FIG. 6 is a flow chart showing the detection of output torque using a cylinder pressure sensor.

In the above embodiment, although the output torque of the engine is detected by the torque sensor 15, it is also possible to provide a cylinder pressure sensor (not shown in the figure) for detecting the combustion pressure within the cylinder so as to detect the actual engine output torque based on the combustion pressure detected by this sensor as shown in the flow chart in FIG. 6.

In the flow chart of FIG. 6, in step 11, a value corresponding to the indicated mean effective pressure Pi is obtained by integrating the cylinder pressure detected by the cylinder pressure sensor with a predetermined integration crank angle range, and in the next step 12, the actual output torque Torque is computed as Torque=$k\emptyset \times$Pi-k1 based on this indicated mean effective pressure Pi and constants $k\emptyset$, k1.

Then, this output torque Torque=$k\emptyset \times$Pi-k1 may be used in place of the detection result by the torque sensor 15.

Further, in the above embodiment, although the ignition timing correction amount DADV and the auxiliary air flow rate Q are feedback controlled so as to generate actually an engine output torque corresponding to the target idle speed $N_{SET}$, a construction is possible wherein, at the time of controlling the ignition timing correction amount DADV and the auxiliary air flow rate Q based on the basic output torque $T_{BASE}$, the correction output torque required for suppressing variations in the engine rotational speed is obtained, and the basic output torque $T_{BASE}$ is corrected by the obtained correction output torque, thereby stabilizing the engine rotational speed near the target idle speed.

In other words, the actual engine output torque which is excess or insufficient for maintaining the engine rotation at a constant value is obtained from the engine output torque computed based on variations in the engine rotational speed Ne, and then the basic output torque $T_{BASE}$ is corrected by the obtained actual engine output torque, thereby the required output torque is computed so that the target idle speed $N_{SET}$ can be obtained in a stable manner.

Figure 7:
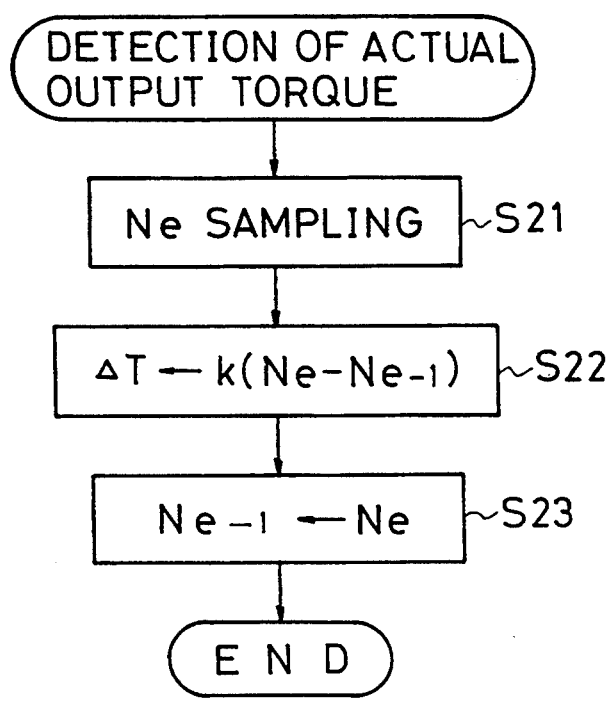
FIG. 7 is a flow chart showing the detection of output torque based on variations in the engine rotational speed.

The computation of the engine output torque based on variations in the engine rotational speed Ne is carried out according to the flow chart of FIG. 7.

In the flow chart of FIG. 7, first in step 21, the engine rotational speed Ne detected as the period $T_{REF}$ of the reference signal REF output by the crank angle sensor 10 is sampled, and next in step 22, the value obtained by multiplying the difference between the engine rotational speed Ne of the latest sample and the engine rotational speed $Ne_{-1}$ at the previous sample timing by a predetermined constant k is set as the engine output torque $\Delta T=k(Ne-Ne_{-1})$ corresponding to the excess or insufficient output torque amount required to maintain the engine rotational speed at a constant value.

In step 23, for computing variations in the engine rotational speed in the next execution time, the latest sampled engine rotational speed Ne is set to $Ne_{-1}$ as the previous sampled value.

These computations shown in the flow chart of FIG. 7 are carried out in step 5 of the flow chart of FIGS. 3 and 4, and the computation of the auxiliary air supply flow rate Q in step 9 is modified as follows.

When, for example, the engine rotational speed decreases due to an increase in load, since the output torque that has to be increased in order to maintain the target idle speed is the engine output torque $\Delta T=k(Ne-Ne_{-1})$ to be computed as an insufficient component with a negative sign, the computation equation in step 6 is replaced by $T_{tar} \leftarrow T_{BASE}-k(Ne-Ne_{-1})$ so that the ignition timing correction amount DADV and the auxiliary air flow rate Q can be controlled in the direction for suppressing variations in the rotational speed.

Therefore, if the approximate target idle speed $N_{SET}$ can be obtained from the basic output torque $T_{BASE}$, it is possible to control the ignition timing correction amount and the auxiliary air flow rate in the direction for suppressing variations in the rotational speed due to external disturbances such as load change, etc., thereby stabilizing the engine rotational speed in the vicinity of the target idle speed $N_{SET}$. Moreover, since the ignition timing correction amount and the auxiliary air flow rate are increased or decreased according to the change amount of the output torque, it is possible to suppress variations in the engine rotational speed to the minimum value due to a high response characteristic.

In the above embodiment, the ignition timing correction amount and the auxiliary air flow rate are controlled based on the assumption that basically the approximate target idle speed can be obtained according to the basic output torque $T_{BASE}$, and the comparison of the actual engine rotational speed Ne and the target idle speed $N_{SET}$ is not made. However, as shown in the flow chart of FIG. 8, it is possible to obtain the target idle speed $N_{SET}$ with a higher accuracy if the required output torque of the engine is set while comparing the actual engine rotational speed Ne with the target idle speed $N_{SET}$.

In the flow chart of FIG. 8, firstly, in step 31 the target idle speed $N_{SET}$ is set based on the cooling water temperature Tw, and then in step 32, the actual engine rotational speed Ne is detected based on an output signal from the crank angle sensor 10.

Next, in step 33, the excess or insufficient torque $\Delta T$ is computed as $\Delta T = $GAIN$(N_{SET}/Ne_{-1})$, and in step 34, the ignition timing correction amount DADV corresponding to this excess or insufficient torque amount is obtained by retrieving from a map pre-storing $\Delta T$--DADV.

In step 35, the ignition timing ADV is corrected by the obtained ignition timing correction amount DADV and is output.

Next, in step 36, an increase/decrease correction amount ΔQ of the auxiliary air flow rate corresponding to the excess or insufficient torque ΔT is computed according to the following equation.

$$\Delta Q = GAIN \cdot N_{SET} \cdot \Delta T \quad (3)$$

Said GAIN is a conversion coefficient for deriving the excess or insufficient torque required to make the actual engine rotational speed Ne become equal to the target idle speed $N_{SET}$.

In step 37, a duty ratio correction amount ΔDUTY corresponding to the increase/decrease correction amount ΔQ is obtained by retrieving a map prestoring ΔQ-ΔDUTY.

In step 38, the drive signal of the duty ratio $ISC_{ON}$ obtained by adding the correction amount ΔDUTY to the current duty ratio $ISC_{ON}$ is output to the auxiliary air control valve 5.

In the above embodiment, when the actual engine rotational speed Ne is different from the target idle speed $N_{SET}$, the excess or insufficient torque ΔT corresponding to the amount of deviation of the rotational speed is set, and the ignition timing correction and the auxiliary air flow rate correction corresponding to the excess or insufficient torque ΔT are controlled so that the engine rotational speed approaches the target idle speed $N_{SET}$. As a result, when the actual engine rotational speed Ne is different from the target idle speed $N_{SET}$, it is possible to set and control the ignition timing correction amount and the auxiliary air flow rate which are capable of cancelling this difference, so as to correct any variations in the engine rotational speed due to the application of load, etc., with a good response characteristic.

As is apparent from the mentioned above, according to the present invention, the construction is such that the ignition timing correction and the auxiliary air flow rate are controlled by setting the output torque required for obtaining the target idle speed and converting this output torque into the ignition timing correction amount and the auxiliary air flow rate. Therefore, when there is a change in Icad, the torque correction is first made by the ignition timing correction and subsequently the torque correction by the auxiliary air flow rate, is carried out, thereby it is possible to improve the feedback response characteristic of the idle speed to the maximum possible extent and the undershoot of the rotational speed during idle operation can be made small, and also it is possible to reduce the target idle speed. Moreover, since there is no need for carrying out complex computations for obtaining the above effect of improving the response characteristic, there is no need to use an expensive processor and hence any increase in cost can be avoided.

We claim:

1. A method for controlling the idle speed of an internal combustion engine comprising:
    a target idle speed setting step for setting a target idle speed of the engine at the time of idle operation;
    a required output torque setting step for setting a required output torque required for the engine to obtain said target idle speed;
    a required ignition timing correction amount conversion step for converting the required output torque set in said required output torque setting step into a value equivalent to a required ignition timing correction amount;
    a required auxiliary air flow rate computation step for computing a value equivalent to a required auxiliary air flow rate based on the required output torque set in said required output torque setting step and on said target idle speed;
    an ignition timing correction control step for controlling ignition timing correction based on the value equivalent to the required ignition timing correction amount converted in said required ignition timing correction amount conversion step; and
    a valve opening control step for controlling the opening degree of an auxiliary air control valve provided in an auxiliary air path bypassing a throttle valve based on the value equivalent to the required auxiliary air flow rate computed in said required auxiliary air flow rate computation step.

2. A method for controlling the idle speed of an internal combustion engine according to claim 1, wherein said target idle speed setting step comprises a step for detecting the cooling water temperature of the engine and a step for setting the target idle speed based on said detected cooling water temperature.

3. A method for controlling the idle speed of an internal combustion engine according to claim 1, wherein said required output torque setting step comprises a step for setting a basic output torque based on the target idle speed and the cooling water temperature of the engine a step for setting an auxiliary equipment load correction amount set according to a drive load applied to auxiliary equipments, a step for setting a corrected basic output torque by adding said auxiliary equipment load correction amount to said basic output torque, a step for detecting an output torque of the engine, and a step for setting a finally required output torque by adding a difference between said corrected basic output torque and said detected engine output torque to said corrected basic output torque.

4. A method for controlling the idle speed of an internal combustion engine according to claim 1, wherein said required output torque setting step comprises a step for setting the basic output torque based on the target idle speed, the cooling water temperature of the engine and the drive load applied to auxiliary equipment, a step for computing an excess or insufficient output torque amount based on variations in the engine rotational speed, and a step for setting a required output torque by correcting the basic output torque with said excess or insufficient output torque amount.

5. A method for controlling the idle speed of an internal combustion engine according to claim 1, wherein said required output torque setting step is a step for computing the excess or insufficient output torque amount based on variations in the engine rotational speed, and said required auxiliary air flow rate computation step is a step for computing the required auxiliary air flow rate proportionally to the value obtained by integrating said target idle speed with an excess or insufficient output torque amount.

6. A method for controlling the idle speed of an internal combustion engine according to claim 1, wherein said required auxiliary air flow rate computation step comprises a step for computing an overall required air flow rate by integrating the required output torque with the target idle speed, and a step for computing the required auxiliary air flow rate by subtracting an air flow rate leaking from said throttle valve from said overall required air flow rate.

7. A method for controlling the idle speed of an internal combustion engine according to claim 1, wherein said ignition timing correction control step stops the correction operation after the lapse of response delay time of the correction control of the auxiliary air flow rate.

8. An apparatus for controlling the idle speed of an internal combustion engine comprising:
- a target idle speed setting means for setting a target idle speed of the engine at the time of idle operation;
- a required output torque setting means for setting a required output torque required for the engine to obtain said target idle speed;
- a required ignition timing correction amount conversion means for converting the required output torque set in said required output torque setting means into a value equivalent to a required ignition timing correction amount;
- a required auxiliary air flow rate computation means for computing a value equivalent to a required auxiliary air flow rate based on the required output torque set in said required output torque setting means and on said target idle speed;
- an ignition timing correction control means for controlling ignition timing correction based on the value equivalent to the required ignition timing correction amount converted in said required ignition timing correction amount conversion means; and
- a valve opening control means for controlling the opening degree of an auxiliary air control valve provided in an auxiliary air path bypassing a throttle valve based on the value equivalent to the required auxiliary air flow rate computed in said required auxiliary air flow rate computation means.

9. An apparatus for controlling the idle speed of an internal combustion engine according to claim 8, wherein said target idle speed setting means comprises a means for detecting the cooling water temperature of the engine and a means for setting the target idle speed based on said detected cooling water temperature.

10. An apparatus for controlling the idle speed of an internal combustion engine according to claim 8; wherein said required output torque setting means comprises a means for setting a basic output torque based on the target idle speed and the cooling water temperature of the engine, a means for setting an auxiliary equipment load correction amount set according to a drive load of auxiliary equipments, a means for setting a corrected basic output torque by adding said auxiliary equipment load correction amount to said basic output torque, a means for detecting an output torque of the engine, and a means for setting a finally required output torque by adding a difference between said corrected basic output torque and said detected engine output torque to said corrected basic output torque.

11. An apparatus for controlling the idle speed of an internal combustion engine according to claim 8, wherein said required output torque setting means comprises a means for setting the basic output torque based on the target idle speed, the cooling water temperature of the engine and the drive load of auxiliary equipments, a means for computing an excess or insufficient output torque amount based on variations in the engine rotational speed, and a means for setting the required output torque by correcting the basic output torque with said excess or insufficient output torque amount.

12. An apparatus for controlling the idle speed of an internal combustion engine according to claim 8, wherein said required output torque setting means is a means for computing the excess or insufficient output torque amount based on variations in the engine rotational speed, and said required auxiliary air flow rate computation means is a means computing the required auxiliary air flow rate proportionally to the value obtained by integrating the target idle speed with the excess or insufficient output torque amount.

13. An apparatus for controlling the idle speed of an internal combustion engine according to claim 8, wherein said required auxiliary air supply flow rate computation means comprises a means for computing an overall required air flow rate by integrating the required output torque with the target idle speed, and a means for computing the required auxiliary air flow rate by subtracting an air flow rate leaking from said throttle valve from said overall required air flow rate.

14. An apparatus for controlling the idle speed of an internal combustion engine according to claim 8, wherein said ignition timing correction control means stops the correction operation after the lapse of response delay time of the correction control of the auxiliary air flow rate.

* * * * *